Patented Apr. 23, 1946

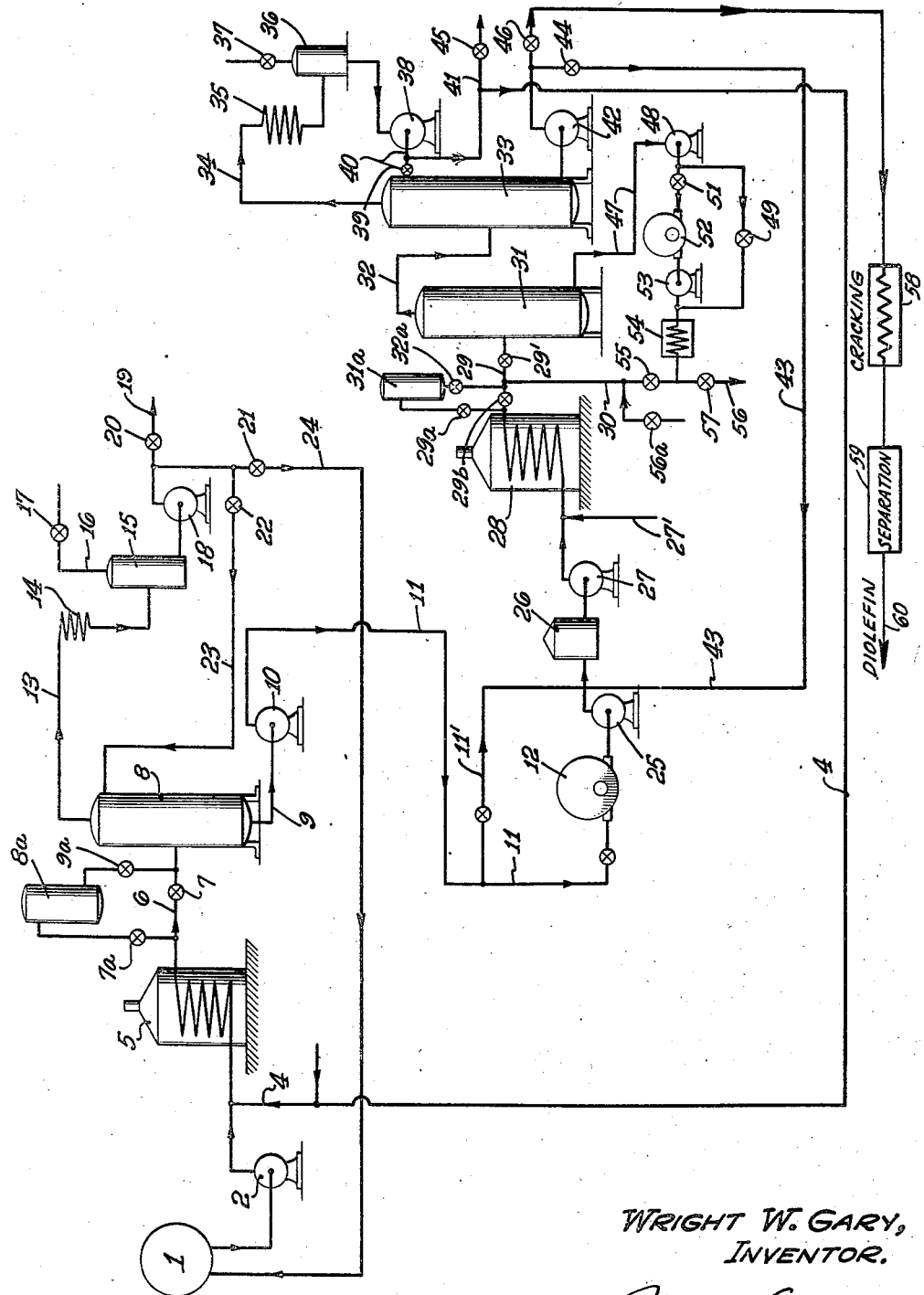

2,398,930

UNITED STATES PATENT OFFICE 2,398,930

PROCESS FOR SEPARATING MONOMERIC DIOLEFINS FROM MIXTURES OF RELATIVELY LOW BOILING DIOLEFIN AND MONO-OLEFIN MONOMERS

Wright W. Gary, Los Angeles, Calif., assignor to Filtrol Corporation, Los Angeles, Calif., a corporation of Delaware Application January 23, 1943, Serial No. 473,410

9 Claims. (Cl. 260—680)

This invention relates to the separation and isolation of diolefins from saturated and mono-olefinic hydrocarbon mixtures. In the production of allene, butadiene, isoprene, or piperylene, and the like, diolefins to be employed for purposes of polymerization into elastomers, these diolefinic hydrocarbons are produced in mixtures with olefinic hydrocarbons and may contain saturated hydrocarbons. Thus, when these diolefins are produced by cracking of petroleum or by dehydrogenation of the corresponding alkanes or alkenes, they are contaminated by propenes, butylenes, pentenes, and also perhaps, by propanes, butanes, and pentanes. Lower and higher hydrocarbons may also be present. The recovery of the diolefins from the mono-olefins and from the saturated hydrocarbons requires extensive and complicated processes of rectification or solvent extraction or combinations of solvent extraction and rectification.

In the processes of my invention I employ selective polymerization for the recovery of the diolefins from the mono-olefins and from the saturated hydrocarbons. I subject the mixture of hydrocarbons to controlled conditions of polymerization such that the diolefins are polymerized but the mono-olefins are substantially un-polymerized. I then separate the mono-olefins and the saturated hydrocarbons from the dimers and the higher polymers formed by the selective polymerization of the diolefinic hydrocarbons. In order to recover the diolefins, I subject these dimers and higher polymers to de-polymerization and thus recover the liberated diolefins.

I may also obtain the separation of the diolefinic from the mono-olefinic hydrocarbons and from any saturated hydrocarbons present by a process of selective de-polymerization. In such a procedure I conduct the polymerization stage to polymerize the mono-olefins as well as the di-olefins. I then subject the polymers thus formed to selective de-polymerization so as to selectively de-polymerize the polymerized diolefins but not to de-polymerize the polymerized mono-olefins. I then separate the low-boiling diolefins generated by the de-polymerization from the remaining polymerized hydrocarbons.

In the polymerization stage of this latter process some cross polymerization between the diolefins and the mono-olefins may occur. I may increase the inter-polymerization of the diolefins over that of the other reactions of polymerization by adding diolefins to the charge as, for instance, by increasing their concentration in the olefins entering the polymerization stage. The reactivity of the diolefins, as measured by their ease of inter-polymerization, is higher than the mono-olefins and this is particularly so in the case of the conjugated diolefins such as allene, erythrene (1,3-butadiene), isoprene (2, methyl, 1,3-butadiene), and piperylene (1,3-pentadiene). These conjugated diolefins will polymerize into dimers and higher polymers.

I may increase the concentration of the diolefins by adding them to the charge from any source as, for instance, by recycling the diolefins formed in the de-polymerization stage of the process.

The dimers and higher polymers formed are of a higher boiling point than the relatively low-boiling hydrocarbons charged to the polymerization step and may be readily separated from the un-reacted components by rectification. Polymerized diolefins so separated may be subjected to a de-polymerizing treatment at a temperature above that employed in the polymerization step. Polymerization is a reversible reaction and the reverse step of depolymerization is preponderant at higher temperatures and lower pressures. Thus, the polymerized diolefins may be subjected to de-polymerization reaction at a temperature of about 700 to 900° F. to cause the de-polymerization of the polymers. The liberated low boiling, low molecular weight diolefins may then be separated from the unconverted polymers by rectification.

Where the polymerization reaction has been carried on non-selectively to polymerize both mono and diolefins and the de-polymerization has been carried on selectively to de-polymerize the dimer and higher polymers of the diolefins, there will be left, upon separation of the liberated diolefins, the polymers of the mono-olefins. These mono-olefins may include hexene, heptenes, octenes, and higher mono-olefins, depending on the constitution of the charge and operating condition of the polymerization stage. I may by subjecting these polymers, that is, these higher molecular weight mono-olefins, to a cracking reaction, convert them into butadiene and the corresponding saturated hydrocarbon remaining after the splitting-off of the butadiene. Thus, for example, hexene will be cracked into butadiene and ethane. I may also subject the entire polymer fraction, without intermediate selective de-polymerization, to a cracking reaction and obtain a de-polymerization of the polymers of diolefins and a conversion of the higher molecular weight mono-olefins into butadiene and saturated hydrocarbons and perhaps some relatively low molecular weight mono-olefins.

Diolefins will polymerize non-catalytically at high pressures ranging up to 5000 pounds and relatively high temperatures (700 to 900° F.). In order to get a commercially desirable degree of polymerization by such uncatalyzed thermal methods, temperatures and pressures employed must be such that the side reactions take place to considerable degree, resulting in olefin and di-olefin unions to form polymers higher than trimer. Cracking of both polymer and mono-olefin and saturated hydrocarbons occurs, thereby making diolefin recovery impractical and of low yield. In order to minimize these unfavorable side reactions, I employ an active catalyst. I operate at a lower temperature and a lower pressure than is required in thermal non-catalytic methods to obtain the desired degree of polymerization, such temperatures being about 350 to about 550° F. Due to the lower temperature and pressure which are employed in my process, the polymer is primarily dimer and trimer which can be separated by rectification and then de-polymerized by a catalyst under lower pressures (0 to 300 lbs.) and higher temperature conditions (800 to 900° F.) than are employed in the polymerization stage of my process. Cracking of the olefins and the polymers thereof is inhibited by the low pressures and low temperatures which are employed.

As a further aid to obtaining maximum yields of dimers and trimers and to avoid undesirable side reactions, I may increase the concentration of the diolefins or the feed to the catalytic polymerization stage by recirculation of the diolefin isolated from the products of the de-polymerization reaction by an appropriate rectification procedure.

By the above procedure and by the selection of the proper catalyst, as hereinafter further set forth, I may cause a selective polymerization of the diolefins to dimers and trimers with a minimum of side reactions. On rectification I may separate the dimers and trimers from the unreacted mono-olefins and saturated hydrocarbons. I thus produce a mixture of relatively low molecular weight polymers of the diolefinic hydrocarbons substantially free of mono-olefins and saturated hydrocarbons and containing a minimum amount, or being substantially free, of polymers of the mono-olefins or cross-polymers of mono-olefins and diolefins. These diolefinic polymers may then be depolymerized, as explained, to produce the original diolefinic hydrocarbons.

When employing the catalyst active for the polymerization of mono-olefins, I obtain both the higher mono-olefin polymers as well as the diolefin polymers, and also the higher molecular weight cross-polymers of the mono-olefins and the diolefins. I increase the inter-polymerization of the diolefins by increasing the concentrations of the diolefins in the feed by recycling diolefins to the feed, as has been explained. By selectively catalytically de-polymerizing the diolefinic polymers at a temperature lower than that necessary for the de-polymerization of the mono-olefin polymers and at a lower pressure, I reform the diolefin monomers without a substantial de-polymerization of the mono-olefin polymers. I then separate the diolefins from the polymer fractions by appropriate rectification.

Catalysts useful for this purpose, where it is desired not to polymerize mono-olefins, are usually those which have a low activity, as mono-olefin polymerizing catalysts, as distinguished from the well known high activity mono-olefin polymerizing catalyst such as sulphuric acid and solid phosphoric acid. I may employ as catalysts acid activated montmorillonite clays heated with acid to produce a product containing from 10–20% $Al_2O_3$, preferably from 15 to 20% $Al_2O_3$. This catalyst may be usefully improved by base exchange with aluminum ions by reaction with soluble aluminum salt, such as aluminum sulfate, or may be activated by deposit of hydrated alumina by reaction of soluble aluminum salt with ammonia in the presence of the acid activated clay. I may use silica gel, or co-precipitated alumina-silica gels, or mixed alumina silica gels formed by successive formation of the silica and alumina gels, or I may employ aluminum chloride or hydrofluoric acid. In polymerizing the mono-olefins as well as the diolefins, where the polymerization is to be carried on non-selectively, I may employ the more active polymerizing catalysts such as solid phosphoric acid supported on suitable carriers such as alundum, or I may use sulfuric acid. Such catalysts are well known and widely employed as polymerizing agents for mono-olefins.

The de-polymerization of the polymers may be carried out, employing the same catalyst as employed in the polymerization stage; for instance, the acid treated clay or such clay modified as described above or the silica gel or silica alumina gels described above.

This invention will be further described in connection with the figure which illustrates one specific embodiment of my invention.

The charging stock is contained in tank 1. This charging stock contains both the mono-olefins and the diolefins and any contaminating saturated hydrocarbons. This charging stock may be a fraction produced by the cracking of petroleum oil by thermal or by catalytic process. It may be a fraction produced by the dehydrogenation of a paraffinic or of an olefinic hydrocarbon. Thus, it may be a fraction preponderantly composed of butanes and butenes together with lesser amounts of butadiene. This fraction may also contain pentanes and even hexanes together with pentenes and perhaps hexenes. It may also contain some propane and propenes and perhaps some allene. This charging stock is pumped by pump 2 through the furnace 5. Into this stream is introduced through line 4 either mono-olefinic or diolefinic hydrocarbons or mixtures thereof. Thus, for instance, the hydrocarbons which are preponderantly diolefinic withdrawn through line 4i, as will be later described, may be reintroduced through line 4. I may also introduce through line 4, from a source not shown in the drawing, any catalyst material which is desired to be charged with the hydrocarbons to assist in the reactions occurring in furnace 5. The pressure on the hydrocarbons in the coil positioned in furnace 5 is controlled by valve 7 on the discharge line 6. The temperatures and pressures maintained on the reactants in the furnace 5 are determined by the desired degree of reaction and whether the reaction of polymerization which occurs in furnace 5 is of the selective or the non-selective type, as has been previously described.

The products from the furnace 5 are introduced into the tower 8 wherein a separation occurs with the aid of reflux introduced through line 23 to separate the high boiling polymerized hydrocarbons from the lower boiling unpolymerized hydrocarbons. The unpolymerized hydrocarbons are withdrawn as a vapor through line 13 and condensed in condenser 14. Instead of introducing the catalyst through line 4 to pass commingled with the oil through coils in furnace 5, I may employ a stationary bed of catalyst in catalyst case 8a. In such case, I close valve 7 and open valves 7a and 9a and pass the oil downward through catalyst case 8a and into separator 8. The furnace 5 acts merely as a pre-heater in this operation. The condensate is collected in the accumulator 15. The uncondensed gases are withdrawn through line 16 controlled by the valve 17. The condensate collected in accumulator 15 is withdrawn by pump 18 and may, by the control of valves 20, 21, and 22, in part be passed through line 23 to act as a reflux in tower 8, and in part may be passed through line 24 to be reintroduced into tank 1 to be recycled through the system, or part or all may be withdrawn through line 19 for other uses. The high boiling polymers separated in tower 8 are withdrawn through line 9 by pump 10.

If the catalyst case has been employed, the polymers are pumped by pump 10 through line 11 and 11' into tank 26, the valve on line 11' being open and the valve on line 11 being closed. If catalyst has been employed in the polymerization reaction in the coils of furnace 5, the catalyst is separated together with the polymers in tower 8 and withdrawn through line 9. In such case the stream is passed through line 11, valved line 11' being shut off, and through the continuous filter 12, which may be of the rotary type, by appropriate control of the valves on line 11 and line 11'. The filtrate is withdrawn by pump 25 and introduced into tank 26 into which tank may be also introduced the recycled material passing through line 43, as will be later described.

The polymers are pumped by pump 27 through coils positioned in furnace 28. Catalysts to be employed in the de-polymerization reaction carried out in coils of furnace 28 are introduced through line 27'. The nature of the catalyst and the temperatures and pressures maintained in the coils 28 will depend upon whether the reaction of de-polymerization is of the non-selective type, as previously described, and upon whether the charging stock in tank 26 consists substantially of the polymers of the diolefins with little or no contamination by polymers of the mono-olefins or cross-polymers between mono-olefins and diolefins produced by non-selective polymerization. The oil and catalyst pass through valves 29b to the separator 31, valves 29a, 32a being closed. I may employ a stationary bed of catalyst to obtain the desired reaction. In such case the furnace 28 acts as a preheater and the oil passes through valved line 29a, valve 29b being closed, and through the catalyst case 31a and through the valved line 32a.

Upon discharge from the furnace or the catalyst case 31a, the de-polymerized material is quenched by a stream of oil or other quenching medium introduced through line 30 at a temperature and in amount sufficient to reduce the temperature of the stream in 29 to inhibit or completely stop any further de-polymerization reaction or any concomitant cracking reaction which may have occurred. The pressure on the reactants in the coils of furnace 28 and the pressure on the catalyst case 31a is controlled by valve 29' on line 29. The materials discharge through this pressure reduction valve into the separator 31. In this separator the dousing oil used as a quench medium, if it is of a relatively high boiling point such as a gas oil fraction, is separated in liquid form together with any catalyst material which may have been introduced into the coil in furnace 28, together with the polymers of said diolefins or mono-olefins or cross-polymers of mono and diolefins which have remained undepolymerized by the reaction in the coil of furnace 28 or the catalyst case. The de-polymerized, relatively low boiling olefins are separated as a vapor. The separated vapors are introduced into the rectifying tower 33 where they are fractionated by the aid of reflux introduced through line 40 to separate the polymers from the monomers formed in the de-polymerization reaction. The monomeric hydrocarbon fraction which may be composed of the diolefins or mixtures of mono-olefins and diolefins, if mono-olefinic hydrocarbons are formed in the de-polymerization, together with any cracked hydrocarbons of low-boiling character formed in this reaction, are withdrawn through line 34, passed through condenser 35, and the condensate collected in the accumulator 36. The condensate composed of the desired monomeric olefins collects as a liquid in accumulator 36 and the lower boiling gaseous fractions are discharged through valved line 37. The condensate is withdrawn by pump 38, and by the proper control of valve 39 and the valve 45 on line 41 the condensate is passed in part as a reflux in tower 33 and in part is discharged through line 41 to suitable storage. Where the de-polymerized monomers withdrawn through line 41 are preponderantly of the diolefinic type and it is desired to increase the concentration of these diolefins in the stream passing to the coils of polymerizing furnace 5, they may be recycled through line 41 and introduced through line 4 for this purpose.

The liquid polymers collected as a bottoms in the tower 33 are withdrawn by pump 42 to storage through valved line 46 by control of the valves 44 and 46, or they may be recycled in part or in whole through line 43 to the tank 26 for retreatment in furnace 28 or catalyst case 31a. Where the process of de-polymerization is carried on selectively the polymers withdrawn by pump 42 will be preponderantly the mono-olefin polymers or the cross-polymers of the mono-olefins and diolefins. The polymers may be passed through a conventional cracking coil as illustrated at 58, and the cracked polymers may be separated by conventional fractionating equipment shown at 59, and the diolefins separated at 60.

The separated quench oil collecting in the bottom of the separator 31 is withdrawn through line 47 by pump 48. If the quench oil contains separated catalytic material, it is passed to the continuous filter 52 through valve 51, valve 49 being closed. The filtrate is withdrawn by pump 53 and passed through cooler 54. If the quench oil contains no catalyst, it may be passed through valved line 49, valve 51 being closed, directly to cooler 54. From the cooler the oil is introduced through line 30 into line 29. Part of the quench oil may be passed through line 56 by appropriate control of valves 55 and 57. Other or additional quenching mediums may be introduced through valved line 56a. I may, for instance, employ steam or an oil from an extraneous source as such medium.

Specific examples of the application of my process for the separation of mono and diolefins illustrate specific applications of my invention.

Thus, the charging stock to my process may be the so-called B—B cut formed by the dehydrogenation of butane or the dehydrogenation of butylene. Such material, for example, may be composed of from 40 to 30% of butylene, from 20 to 40% of butadiene, and from 40 to 30% of isobutylene. It is passed from tank 1 by the pump 2 and polymerized at temperatures of about 350 to 550° F. High pressures are useful in the polymerization but are not essential for such purpose. Temperatures and catalysts are so chosen that at the pressures maintained in the furnace 5 or in catalyst case 8a, the butadiene is polymerized into polymers. Such polymers may contain over 50%, for instance 60% dimer of butadiene, the rest being substantially entirely the higher polymers of butadiene, such as trimer, with only a minor proportion of higher molecular weight mono-olefins and only a minor proportion of cross-polymers between the mono-olefins and diolefins. The butylenes passing through the polymerization stage are in substantially unreacted form. The butylenes and any unpolymerized butadiene are collected as a condensate in 15.

The polymers are separated from the butylenes and any unreacted butadiene and charged through line 9 to the depolymerization furnace 28 or to catalyst case 31a. In the de-polymerization furnace they are heated to a temperature higher than that maintained in furnace 5. They are de-polymerized in the presence of catalysts of the same nature as those employed in the polymerization stage at higher temperature and/or at lower pressures than that maintained in the catalytic polymerization. For instance, the temperature may be about 800 to about 900°, and the pressures may range from about 0 to about 300 pounds per square inch. Such catalysts act at these higher temperatures and/or lower pressures as de-polymerizing catalysts. The de-polymerized polymers are then quenched with a gas oil, or other high boiling oil having a boiling point substantially higher than the boiling point of the polymers, to stop any further reaction. The polymers remaining un-depolymerized, together with the liberated butadiene resulting from the de-polymerization reaction, are further rectified in the rectification tower 33 and the butadiene is collected as a condensate in the accumulator 36. The un-depolymerized polymers from the coils of 28 or catalyst case 31a collect as bottoms in the tower 33 and are recycled to be introduced with fresh charge into the de-polymerizing furnace 28. The butadiene collecting in 36 may be recycled in part to the polymerization furnace 5 for the purpose of increasing the concentration of the butadiene in the charge to retard any polymerization which may otherwise occur involving the butylenes and isobutylenes and to increase the proportion of the butadiene polymers in the polymerized fraction.

The above process, as has been previously explained, may also be applied to the separation of the other diolefins such as isoprene or piperylene, as well as butadiene and allene from hexenes and pentenes and from other mono-olefins such as propylene and butylene, if such be present.

In employing my process I may, instead of employing selective polymerization as a first stage, carry on the process as a non-selective polymerization process. Thus, in charging the B—B cut, previously referred to, I may employ a catalyst and temperatures and pressures in the polymerization stage to cause a polymerization of both the butylene or isobutylene and the butadiene. I increase the concentration of the butadiene in the B—B cut by recirculating butadiene from line 41 to line 4, previously explained, and thus increase the concentration of the butadiene in the B—B cut above the range of 20-40% of the feed, for example 40 to 75% of the feed or to a higher percentage thereof. I may employ temperatures of 300 to 600° F. and pressures of from atmospheric to 500 pounds or more to cause such non-selective polymerization and employ the proper catalyst, as described above. I may instead of employing a vapor phase polymerization process, such as previously described, carry out this non-selective polymerization procedure in a liquid phase, employing sulfuric acid as a polymerizing agent in a manner conventional for the liquid phase sulfuric acid polymerization of mono-olefins. The polymers of the mono-olefins and the diolefins are separated by conventional rectification procedures. I therefore produce by such non-selective polymerization a polymer composed of mono-olefins, such as octenes resulting from the inter-polymerization of butylenes, and dimers resulting from the dimerization of the butadiene and also form higher polymers of butadiene. I may also form some inter-polymers between the butadiene and the butylene. The non-selective polymers are selectively de-polymerized by contacting them with a catalyst, as described above, at a temperature of 800 to 900° F., and at a relatively low pressure, i. e., above atmospheric to 300 pounds per square inch. The de-polymerized butadiene fraction is separated from the un-depolymerized polymers as explained above.

The foregoing description and examples are not intended to be a limitation of my invention, it being understood that various changes and modifications may be made therein without departing from the scope of the appended claims.

I claim:

1. A process for separating butadiene from mixtures of butadiene and more saturated hydrocarbons which comprises, catalytically polymerizing butadiene into polymers which are higher boiling than said butadiene and the said saturated hydrocarbons, separating the polymerized butadiene from said relatively lower boiling, more saturated hydrocarbons, catalytically de-polymerizing the butadiene polymers, separating, removing the resulting butadiene, and recirculating a portion of the separated butadiene to the polymerization stage to promote the polymerization of butadiene.

2. A process for separating butadiene from mixtures of butadiene and mono-olefins which comprises, catalytically polymerizing butadiene at a temperature of 350 to 550° F. into polymers which are higher boiling than said butadiene and the said mono-olefins, separating the polymerized butadiene from said relatively lower boiling mono-olefins, catalytically de-polymerizing the butadiene polymers at a temperature of 800 to 900° F., separating, removing the resulting butadiene, and recirculating a portion of the separated butadiene to the polymerization stage to promote the polymerization of butadiene.

3. A process for separating monomeric diolefins from mixtures of relatively low boiling diolefin and mono-olefin monomers which comprises subjecting said mixture at an elevated temperature to contact with a diolefin and mono-olefin polymerizing catalyst, catalytically and non-selectively polymerizing said monomers to form relatively high boiling polymers of said monoolefins and polymers of said diolefins, separating said polymers from the unpolymerized monomers, subjecting said polymers to a diolefin polymer depolymerizing catalyst at an elevated temperature sufficiently high to de-polymerize the diolefin polymers but not sufficiently high to substantially decompose the mono-olefin polymers to selectively de-polymerize said diolefin polymers into diolefin monomers without substantial decomposition of the mono-olefin polymers, separating the diolefins monomers from the undecomposed fraction, and recirculating a portion of said diolefin monomers to the polymerization stage to promote the polymerization of the diolefins.

4. A process for separating low boiling diolefins chosen from the group of allene, butadiene, isoprene, and piperylene from mixtures of diolefins and more saturated hydrocarbons which comprises, passing said mixture in vapor phase over a polymerizing catalyst for said diolefins, a catalytically polymerizing such diolefins into polymers which are higher boiling than said diolefins and the said saturated hydrocarbons, condensing and separating the polymerized diolefins from said relatively lower boiling, more saturated hydrocarbons, catalytically de-polymerizing the diolefin polymers, separating, removing the resulting de-polymerized diolefins, and recirculating a portion of the separated diolefins to the polymerization stage to promote the polymerization of the diolefins.

5. A process for separating monomeric diolefins from mixtures of relatively low boiling diolefin and mono-olefin monomers, which comprises subjecting said mixture at an elevated temperature to contact with a diolefin and mono-olefin polymerizing catalyst, catalytically and non-selectively polymerizing said monomers to form relatively high boiling polymers of said mono-olefins and polymers of said diolefins, separating said polymers from the unpolymerized monomers, subjecting said polymers to a diolefin polymer depolymerizing catalyst at an elevated temperature sufficiently high to de-polymerize the diolefin polymers but not sufficiently high to substantially decompose the mono-olefin polymers to selectively de-polymerize said diolefin polymers into diolefin monomers without substantial decomposition of the mono-olefin polymers, separating the diolefin monomers from the undecomposed fraction, subsequently cracking said undecomposed fraction of mono-olefin polymers, converting the same into diolefin monomers, and separating the last-named diolefin monomers.

6. A process for separating butadiene from mixtures of butadiene and mono-olefins, which comprises subjecting said mixture at an elevated temperature to contact with a diolefin and mono-olefin polymerizing catalyst, catalytically and non-selectively polymerizing said butadiene and mono-olefins to form relatively high boiling polymers of said mono-olefins and polymers of said butadiene, separating said polymers from the unpolymerized butadiene and mono-olefins, subjecting said polymers to a diolefin polymer de-polymerizing catalyst at an elevated temperature sufficiently high to de-polymerize the diolefin polymers but not sufficiently high to substantially decompose the mono-olefin polymers, selectively de-polymerizing said butadiene polymers into butadiene without substantial decomposition of the mono-olefin polymers, separating the butadiene from the undecomposed fraction, subsequently cracking said undecomposed fraction of mono-olefin polymers, converting the same into butadiene, and separating and removing said last-named butadiene.

7. A process for separating monomeric diolefins from mixtures of relatively low boiling diolefin and mono-olefin monomers, which comprises subjecting said mixture at an elevated temperature to contact with a diolefin and mono-olefin polymerizing catalyst, catalytically and non-selectively polymerizing said monomers to form relatively high boiling polymers of said mono-olefins and polymers of said diolefins, separating said polymers from the unpolymerized monomers, subjecting said polymers to a diolefin polymer depolymerizing catalyst at an elevated temperature of less than about 900° F. but sufficiently high to de-polymerize the diolefin polymers but not sufficiently high to substantially decompose the mono-olefin polymers to selectively depolymerize said diolefin polymers into diolefin monomers without substantial decomposition of the mono-olefin polymers, separating the diolefin monomers from the undecomposed fraction, and withdrawing the un-depolymerized mono-olefin fraction as a separate product of the process.

8. A process for separating butadiene from mixtures of butadiene and mono-olefins, which comprises subjecting said mixture at an elevated temperature to contact with a diolefin and mono-olefin polymerizing catalyst, catalytically and non-selectively polymerizing said butadiene and mono-olefins to form relatively high boiling polymers of said mono-olefins and polymers of said butadiene, separating said polymers from the unpolymerized butadiene and mono-olefins, subjecting said polymers to a diolefin polymer depolymerizing catalyst at an elevated temperature below about 900° F. but sufficiently high to de-polymerize the diolefin polymers but not sufficiently high to substantially decompose the mono-olefin polymers to selectively de-polymerize said butadiene polymers into butadiene without substantial decomposition of the mono-olefin polymers, separating the butadiene from the undecomposed fraction, and withdrawing the mono-olefin polymers as a separate product of the process.

9. A process for separating butadiene from mixtures of butadiene and mono-olefins, which comprises subjecting said mixture at an elevated temperature to contact with a diolefin and mono-olefin polymerizing catalyst, catalytically and non-selectively polymerizing said butadiene and mono-olefins to form relatively high boiling polymers of said mono-olefins and polymers of said butadiene, separating said polymers from the unpolymerized butadiene and mono-olefins, subjecting said polymers to a diolefin polymer depolymerizing catalyst at an elevated temperature below about 900° F. but sufficiently high to de-polymerize the diolefin polymers but not sufficiently high to substantially decompose the mono-olefin polymers to selectively de-polymerize said butadiene polymers into butadiene without substantial decomposition of the mono-olefin polymers, separating the butadiene from the undecomposed fraction, and recirculating a portion of said butadiene to the polymerization stage to promote the polymerization of the butadiene.

WRIGHT W. GARY.